Dec. 8, 1936.  M. B. GODDARD  2,063,672
METHOD OF AND MEANS FOR CONTROLLING A FILM OF MOISTURE
Filed Feb. 24, 1932  2 Sheets-Sheet 1

INVENTOR.
MERRILL B. GODDARD
BY
ATTORNEY

Dec. 8, 1936.   M. B. GODDARD   2,063,672
METHOD OF AND MEANS FOR CONTROLLING A FILM OF MOISTURE
Filed Feb. 24, 1932   2 Sheets-Sheet 2

INVENTOR
MERRILL B. GODDARD
BY
ATTORNEY

Patented Dec. 8, 1936

2,063,672

UNITED STATES PATENT OFFICE 2,063,672

METHOD OF AND MEANS FOR CONTROLLING A FILM OF MOISTURE

Merrill B. Goddard, Chicago, Ill., assignor, by mesne assignments, to Carrier Engineering Corporation, Newark, N. J., a corporation of New York Application February 24, 1932, Serial No. 594,941

15 Claims. (Cl. 101—147)

This invention relates to methods of and means for treating printing surfaces, and more particularly to the production and control of a film of moisture to be applied on such surfaces.

The art of planographic printing embraces the use of a plate comprising designed portions and non-designed portions. Designed portions are inked by suitable means. The non-designed portions are not inked, and in order that the printing process may be effectively carried out, it is essential that ink be prevented from adhering to the non-designed portions. This provision is brought about by applying a film of moisture to those areas of printing surface comprising the non-designed portions. The moisture effectively repulses the inking materials, so that, in effect, only the designed portions will bear the ink and the finished product will have clear lines of demarcation between the designed portions and the non-designed portions. Prior practice has recognized the use of moisture in repelling ink from non-designed portions, and has utilized, among other things, dampening rollers served by water fountains, or similar water distributing means, for such moistening purposes. The results, however, were not satisfactory, nor the method of application economical or productive of best results, due to a variety of reasons. For example, the film of water applied to the plate was, at times, inadequate, or, on the other hand, too great. The most common fault lay in the uneven distribution of moisture which would result in some surfaces having too much moisture and others not enough. Consequently, the dilution of or the picking up of ink by the rollers, as well as the transferring of moisture from non-designed to designed portions frequently occurred; and, as a result, sharpness of definition, as well as depth and uniformity of color, among other things, were often sacrificed to the inadequacy of the method of moisture application. A solution of this problem has been the goal of the printing art for many years, and although the production of films of moisture on plates, by condensation, has been attempted in the past, it is a matter of record that no successful method of moisture film control has been attained prior to applicant's advent in the field.

The general object of the invention is to provide for the temperature control of a printing surface and the regulation of the character and quantity of a volume of air contacting with said surface, so that a film of moisture of desired character and consistency may at all times be produced. The object, furthermore, is to attain this result regardless of variations in atmospheric conditions surrounding said surface, and in heat and operating load affecting the temperature of said surface.

A feature of the invention resides in the provision of a cooling medium adapted to establish a desired temperature in a support for a printing plate, so that the temperature of the surface of the plate may be held constant, if desired, or may be varied within prescribed limits, as are demanded by the requirements of conditions affecting the surface.

A further feature of the invention resides in the control of condensation of moisture vapor upon a printing surface by regulating the temperature and relative humidity of air impinging upon said surface.

Since the invention is primarily concerned with the production of a film of moisture, always of the same character, never too great, nor too slight in thickness, and always exactly sufficient to meet the ink-repelling requirements of the printing process, applicant provides means for carrying out the invention operative responsive to automatic control, or, if desired, to manual control. Further, since the process may be subjected to extreme conditions in different parts of the world, and in different climates, the process is adapted to be carried on, within practical limits, regardless of variations in temperature affecting the printing surface or the air used in the process for impinging upon said surface.

Thus, an operating feature of the invention consists in maintaining substantially constant either the temperature of the printing surface or the dewpoint of the air impinging upon said surface, and varying, as desired, the element which is not maintained constant.

Another feature resides in carrying out the invention by maintaining the printing surface at a constant temperature and assuring a desired differential between said temperature and the dewpoint of the air impining upon the surface.

A further feature consists in maintaining constant the temperature of the printing surface and maintaining constant the dewpoint of air impinging upon said surface and establishing a desired temperature difference which will only vary as the need for a film of different character develops.

Still another feature provides for the automatic control of temperature of a printing surface responsive to changes in heat load affecting said surface.

Another feature resides in controlling the dewpoint of a volume of air for maintaining a desired dewpoint regardless of the initial character of air desired to be employed in the process.

Another feature making for precision in the production of moisture film resides in the control of the relative humidity of air at a desired dewpoint, so that the rate of condensation upon the printing surface is regulated with maximum accuracy.

Other features, including the control of fluid temperatures used in establishing the temperature of condensation on a printing surface, and covering the circulation of said fluid, as well as features for governing the temperature, dewpoint, and relative humidity of air volumes, as well as their distribution upon a printing surface, and other advantages in structure, design and operation of systems for controlling films of moisture used in the art of planographic printing, will be more apparent from the following description of illustrative forms of the invention to be read in connection with the accompanying drawings, in which:

Figure 2:
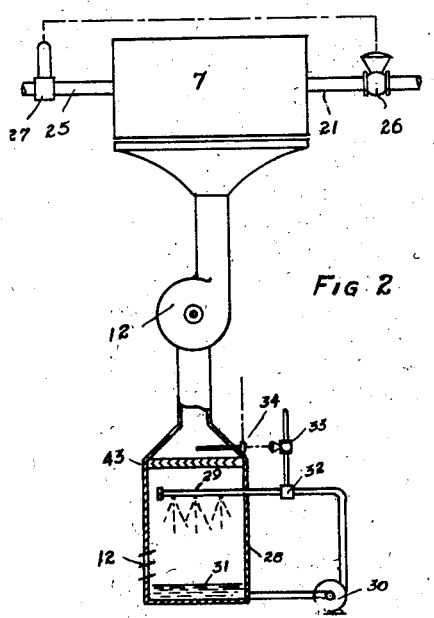
Fig. 2 shows a diagrammatic arrangement of a system of control adapted to carry out the invention.
Figure 4:
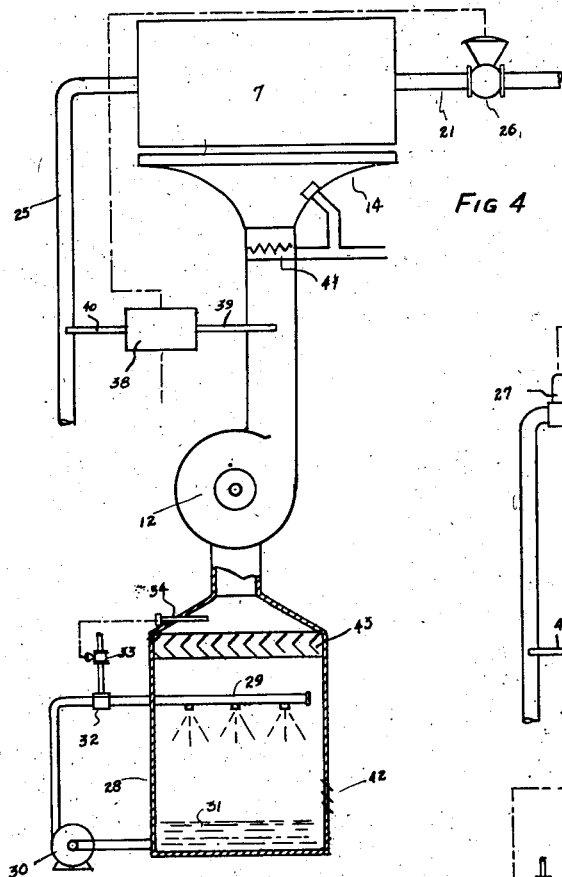
Figure 5:
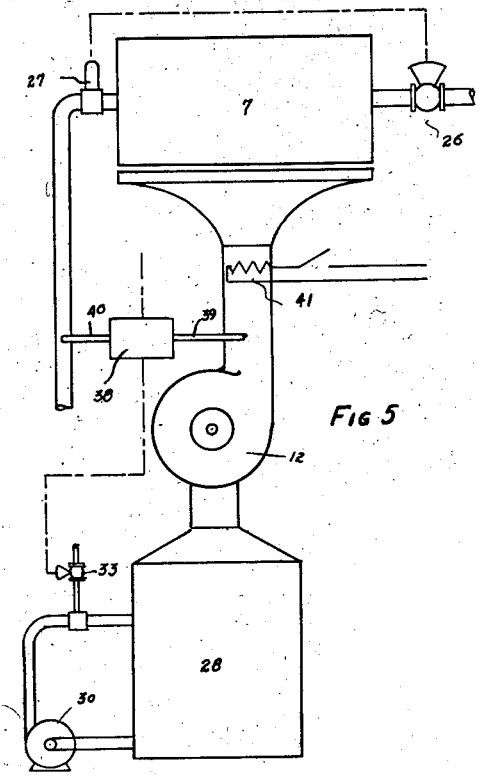
Figure 6:
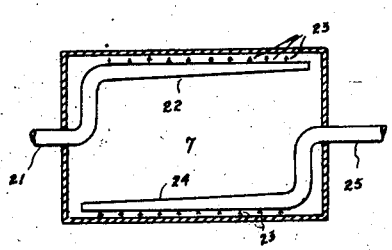

Fig. 4 diagrammatically illustrates another system of control, incorporating an automatic feature of regulation adapted to supplement the system shown, for example, in Fig. 2;

Fig. 5 shows an alternative arrangement of the control illustrated in Fig. 4; and Fig. 6 illustrates a method of distributing a cooling medium within a cylinder, particularly applicable for surface cooling required in carrying out the invention.

Figure 1:
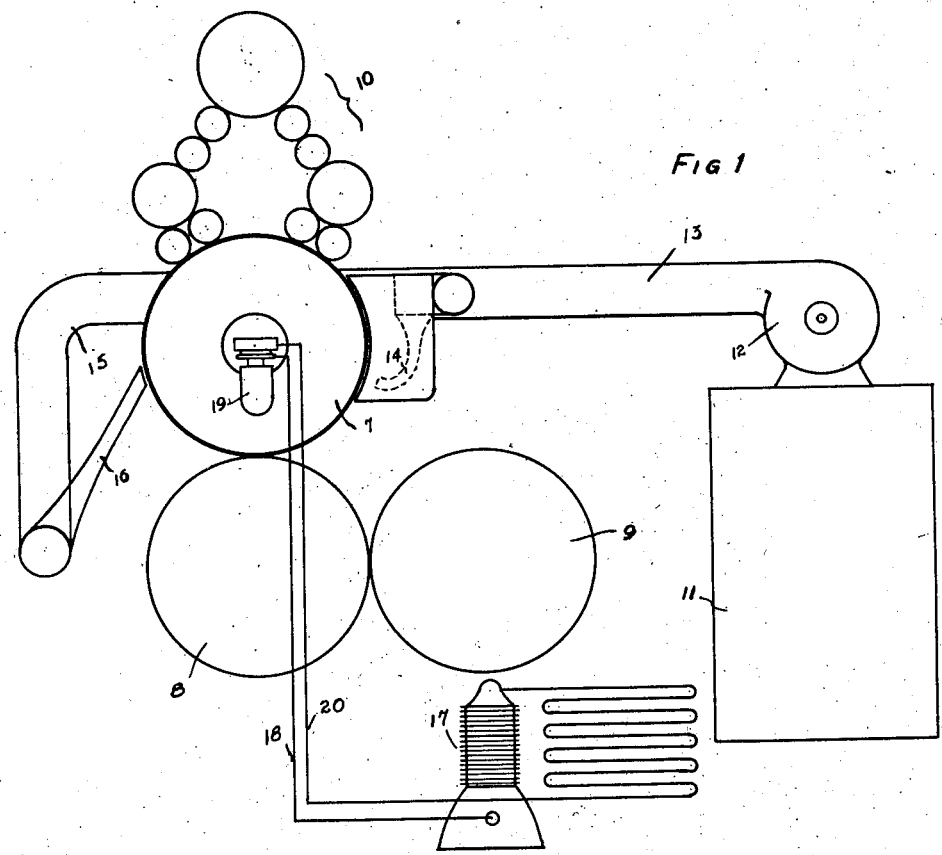
Fig. 1 is a diagrammatic view of one application of the invention, applied, for illustrative purposes, to a rotary lithographic offset printing press.

Considering the drawings, similar designations referring to similar parts, and with particular attention first to Fig. 1, numeral 7 represents a plate cylinder, 8 a blanket or transfer cylinder, and 9 an impression cylinder. The sheets to be printed are fed in conventional manner to the cylinders. The inking of the printing surface on the plate cylinder is accomplished in any suitable manner, as by means of inking mechanism 10, which includes the usual ink distributing and form roller units.

One form of carrying out the invention consists in the formation and control of a film of moisture on the printing surface. A combination of apparatus is provided comprising, as generally illustrated, a conditioning device 11, preferably in the form of a humidifier or similar unit. The humidifier may contain sprays, a circulating means for feeding the sprays, level controls, eliminators for removing entrained moisture, and other apparatus, as more fully described hereafter in connection with the detailed description of the systems of control. A fan 12, in the general arrangement shown in Fig. 1, routs the air from device 11 to distributing duct 13, which, in turn, sends the air in one stream to nozzle 14, and in another stream through distributing duct 15, to nozzle 16. The nozzles may be of any desired form, preferably having their outlets adjacent the outer surface of the cylinder or drum, at desired points thereof. The nozzles may be substantially the full width of the cylinders or drums, and are preferably arranged to discharge the air upon the surface of the drum in a continuous sheet or stream, so that a uniform quantity of air will impinge on the drum at every point of contact. While the illustration shows two nozzles, it is obvious that any number may be provided, at any number of points surrounding the cylinder, and the angle of discharge against the cylinder, as well as the allocation of nozzles may be variously arranged, so that equal distribution and uniformity of impingement may be achieved.

Since it is desired to condense moisture upon the surface of the drum, it is highly desirable to provide means so that the surface will at all times be maintained at a controlled temperature below the dewpoint of the impinging air, and, as generally illustrated in Fig. 1, a refrigerating machine 17 is shown for providing a suitable cooling medium, such as a refrigerant, through discharge line 18 to expansion valve generally designated as 19, the liquid being returned in desired manner, through suction line 20. While Fig. 1 shows the use of refrigerating means for supplying refrigerant, it should be understood that any cooling medium utilized with or without artificial refrigerating means is capable of being used for carrying out applicant's invention and no limitation is placed upon the use of refrigerating means or any other cooling agency.

Considering the systems of control adapted to regulate the formation of moisture on the printing surfaces of cylinder 7, it is first to be noted that the regulating apparatus is adapted to produce a film of moisture and maintain its consistency and thickness of uniform character regardless of atmospheric or climatic conditions affecting the area surrounding the surface. Thus, the moisture film may be produced at any temperature and under any operating heat load, and may be controlled within desirable limits, so that viscosity of the ink, for example, will not be affected, nor other conditions brought about disadvantageous to the printing process or its efficient execution.

In Fig. 2, supply line 21 feeds a cooling liquid to the interior of cylinder 7. The interior of the cylinder may be provided with distributing means such as shown in Fig. 6, provided a liquid such as water is used as a cooling medium, whereas if a refrigerant is used, as in the arrangement of Fig. 1, a plurality of coils may be provided within and adjacent the outer surface of the cylinder; or with a volatile refrigerant it may at times be desirable to dispense with coils and have the refrigerant liquid evaporate directly within the cylinder drum. If a liquid such as water is used, it may enter distributing channel 22, suitably positioned within the cylinder adjacent the outer surface thereof. The channel is provided with a plurality of perforations 23 and the liquid will, therefore, be forced through the perforations and contact directly with the side of the cylinder. A collecting or discharge channel 24 will intake the liquid through perforations 23 responsive to suction of discharge line 25, and the liquid will thereupon leave the cylinder for reuse in the process or other disposition. By providing an intake and discharge pipe adjacent the inner surface of cylinder 7, it is possible, when desired, to maintain the surface of the cylinder at a desired temperature without having it filled with coling fluid. In other words, a small quantity of cold water, for example, may be supplied to the cylinder and by centrifugal force or mechanical means, this may be caused to contact with or be held against the inner surface of the cylinder. This is of particular advantage, since a small change in the outside temperature affecting the surface of the cylinder will cause a pronounced effect on the small quantity of cooling fluid; and a thermostat responding to changes in temperature at the surface, as will hereafter be described for controlling the flow of cooling fluid will, therefore, assure prompt and sensitive control.

The pipes 21 and 25 connecting with channels 22 and 24 make suitable leak-proof connections upon entering and leaving the cylinder, and any desired stuffing box or sealing means may be employed for making leak-proof connections. The valve 26 admits liquid in varying amount to supply line 21 serving the cylinder, and is preferably operative responsive to thermostatic control 27. The thermostatic control may be set to maintain a desired temperature within the drum, thus assuring the maintenance of the printing surface on the drum at a desired temperature. Assuming the temperature rises, the thermostat will function to open the valve and increase the circulation through the drum, whereas, if the temperature should fall below the desired level, the converse operation would take place and the valve somewhat closes to restrict the circulation. The thermostatic element can, therefore, operate to maintain a constant temperature, regardless of affecting heat load by controlling the circulation of cooling fluid.

The humidifying device 28 is provided with a series of sprays 29, served by pump 30, which continually recirculates water from a well 31, served by any suitable source of supply, not shown, so that circulation of fluid will not be interrupted. Air inlet 42 is suitably provided with louvres, as illustrated, or air may otherwise be admitted for passage through the sprays, eliminators 43 and consequent routing to the nozzles, such as 14 and 16 by fan 12. Heating means 32 may vary the temperature of the water or fluid sent to the sprays and is under control of valve 33 (which may be a valve for controlling the steam supply, in the event steam is used for heating, or may be an electrical switch for controlling the source of current in the event an electrical resistance is used for heating purposes). The arrangement is not limited to any particular form of heating means. Control means 34, preferably a thermostat, is located at the outlet of the humidifier, and, therefore, responds to changes in the temperature of the air leaving the humidifier. Since the air leaving the humidifier will be saturated, at which point the wet bulb temperature, dry bulb temperature and dewpoint are the same, the thermostat may, in effect, be deemed to respond to changes in any of these values. The thermostat will, therefore, control the temperature of the emerging air by regulating the control instrumentality 33. Instead of a humidifier, such as described, it is possible to substitute a vaporizer means of any suitable character, and no limitation is made as to the character of the instrumentality to be employed for controlling the moisture content of the air supplied to the printing surface. Fan 12, as illustrated, will discharge the air from the humidifier against the surface, as through nozzles 14 and 16, shown in Fig. 1.

In operation, the thermostat 27 will be set at a desired point, and hence maintain constant the temperature of the printing surface at a predetermined value, say between 50°–85°, depending upon the cooling medium employed. Of course, if desired, the surface may be cooled to a temperature lower than 50, although if the temperature of the printing surface is reduced too low, the quality of printing will be impaired. After setting the thermostat so that a desired printing surface temperature will be constantly maintained, the thermostat 34 is set a desired number of degrees higher than that of the setting for thermostat 27. The greater the differential between the two settings, the greater will be the amount of moisture precipitated upon the surface, and by controlling the differential between the dewpoint (which will be equal to the dry bulb temperature) of the saturated air leaving the humidifier and the temperature of the printing surface, the degree of condensation, and thus the character of the film of moisture produced on the surface, will be controlled. If a greater amount of condensation is required, the thermostat 34 is set to increase the differential. This will cause greater heat effect, as by opening of steam valve 33, to be imparted to the spray water, and hence air at a higher temperature and with a larger amount of moisture vapor will be furnished. By setting the thermostat to decrease the differential, an opposite result will take place, and air with less moisture content will be supplied to the surface, and the film of moisture will, therefore, be reduced in thickness.

Figure 3:
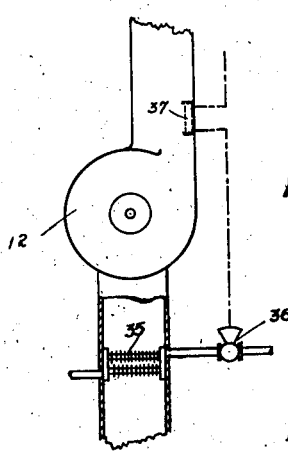
Fig. 3 is directed to a modification adapted to be employed with the arrangement of Fig. 2.

In Fig. 3 is illustrated a method of exerting a finer control in the arrangement shown in Fig. 2. A reheater 35 is provided between the outlet of the humidifier and the discharge nozzles. In the arrangement of Fig. 3, it is placed between the discharge end of the humidifier and the fan. This reheater may be in the form of an electrical resistance or may comprise a series of steam coils. For illustrative purposes, steam coils are shown supplied from a suitable source by valve 36, under control of hygrostat 37. The hygrostat may be set to control the relative humidity of the conditioned air, say at fifty per cent. By controlling the valve 36, the reheater 35 will raise the dry bulb temperature of the conditioned air and hence lower the relative humidity to the desired point. If the relative humidity increases under some conditions, the hygrostat would cause more steam to be supplied in order to provide greater reheating effect, whereas if the relative humidity dropped, the supply of steam would be diminished. The provision of a relative humidity control makes for extreme preciseness in control. It results in providing a lag factor in the air, so that the precipitation or condensation upon the printing surface will be modified not only by the difference between the dewpoint of the air and the temperature of the surface, but in varying character as fluctuations in dewpoint and surface teperature tend to change the extent of precipitation. For example, the surface temperature, as heat load conditions vary, will fluctuate—say within a degree or more. So also, the dewpoint might vary a degree or more. The sensible heat in the air supplied by the reheating coil tends to iron out the inequalities in the temerature and dewpoint curves, so that greater accuracy is attained in the production of a film of moisture of uniform character, regardless even of slight variations in the controlled surface temperature and air dewpoint.

In Fig. 4 an arrangement similar to that of Figs. 2 and 3 is represented, and an automatic differential control feature additionally provided. Instead of utilizing thermostat 27 in the liquid discharge line, as shown in Fig. 2, differential thermostat 38 is positioned preferably in the duct between the outlet from the humidifier and the nozzles. One element of the differential thermostat responds to changes in the temperature of the cooling medium, discharging from the cylinder, whereas the other element is subjected to the passage of air from the humidifier. Assuming it is desired to maintain a predetermined differential between the dewpoint of the air and the temperature of the surface, element 39, subjected to the discharge air, would be set at a certain value, and element 40 would respond to changes in cooling medium temperature. The dewpoint of the air could be maintained constant by the control illustrated, heretofore described in connection with the arrangement of Fig. 2. The water temperature, however, would vary, responsive to changes in heat load. If the desired differential between surface temperature and dewpoint remained constant, the differential thermostat would not operate. If, however, the desired differential were not maintained, as, for example, when the surface temperature tended to rise, the differential thermostat would control valve 26 and remedy the condition, thereupon restoring the desired differential.

Instead of controlling valve 26, the arrangement of Fig. 5 could be employed in which thermostat 27 is provided for control of valve 26, but wherein valve 33 is under control of differential thermostat 39. In this case, the temperature of the surface would always be maintained constant. As the dewpoint of the air tended to vary, thermostat 39 would exert its control on valve 33, so that the dewpoint variation would be remedied, and the differential between desired dewpoint and desired surface temperature restored. The reheater 41, of Figs. 4 and 5, is manually controlled, although the hygrostatic control of Fig. 3 may be here incorporated with like effect as in the arrangement of Fig. 2.

While illustrative methods of control have been described for carrying out applicant's objects, it is believed obvious that various modified arrangements may be used for establishing desired differentials between the temperature of the surface upon which a film of moisture is to be formed, and the dewpoint of air to be discharged upon said surface; and applicant does not limit himself to any particular method of controlling the amount of absolute humidity which will be precipitated upon a surface—any analogous means for carrying out similar purposes being deemed within the purview of the invention.

Having described my invention, what I claim as new and desire to secure by Letters Patent of the United States is:

1. A method of producing a film of moisture upon a surface of the character described, consisting in impinging a volume of air against the surface and controlling the condensation of moisture vapor in said air upon said surface by maintaining substantially constant the temperature and relative humidity of the impinging air, and varying the temperature of the surface by regulating the circulation of a fluid utilized to conduct heat from the underside of the surface to maintain constant a desired differential with respect to the temperature of the air.

2. A method of controlling the condensation of moisture vapor upon a surface of the character described, consisting in controlling the temperature of the surface responsive to changes in heat load affecting the temperature of the surface, impinging a volume of air against the surface, controlling the dewpoint of said air at a desired number of degrees above the temperature of the surface, impinging said air at a desired number of degrees above the temperature of the surface in response to variations in the heat load affecting said dewpoint temperature, and lowering the relative humidity of the air, so that it will impinge against the surface in a partially saturated condition.

3. A method of producing a film of moisture of uniform character on a printing surface, consisting in controlling the temperature of the surface responsive to changes in heat load affecting the surface, impinging against the surface a volume of air having a dewpoint temperature higher than the temperature of said surface, controlling the dewpoint temperature of said air responsive to changes therein and controlling relative humidity of said air, so that it will impinge against the surface in partially saturated condition.

4. A method of maintaining a desired differential between the temperature of a surface upon which moisture is to be condensed, and the dewpoint of air to be impinged against said surface, consisting in circulating a fluid one one side of the surface for regulating the temperature thereof, controlling the dewpoint of a volume of air impinging against the other side of the surface in response to changes in the condition of the surface, and varying the circulation of the fluid responsive to variations in heat load affecting the surface, so that the temperature of the surface will always be a predetermined number of degrees below the dewpoint of the air.

5. In a system of the character described, a printing surface, a holder for said surface, means for circulating a cooling fluid through the holder for controlling the temperature of the surface, means operative responsive to variations in heat load affecting the surface for varying the circulation of said fluid, means for discharging a volume of air against the surface, means for controlling the dewpoint of said air with respect to the temperature of said surface, said last named means including a differential control having one element responsive to the condition of the fluid and another element responsive to the condition of the air.

6. In a system for producing a film of moisture upon a planographic surface of the character described, a drum mounting a printing surface, means for circulating a fluid through said drum, means for controlling the circulation of fluid within the drum for controlling the temperature of the surface, a humidifying device, means for controlling the dewpoint of air treated by the device, interconnecting means between both aforesaid means last mentioned for controlling the differential between the temperature of the surface and the dewpoint of the air, and means for impinging said air against the surface on the drum.

7. A combination of apparatus for controlling the formation of a film of moisture on a surface, a drum, a printing surface on the drum, means for supplying a cooling medium to the interior of the drum, a thermostatic device controlled by the cooling medium, a valve for regulating the volume of the medium under the control of said device, a humidifier, means for discharging air treated by the humidifier against said surface, and means for varying the relative humidity of air discharged from the humidifier at a desired dewpoint.

8. A combination of apparatus for controlling the production of a film of moisture on a surface, comprising a drum bearing a surface to be moistened, means for supplying a cooling medium to the drum, a device for supplying humidified air, means for controlling the dewpoint of the air, a reheating device for controlling the relative humidity of the air leaving the humidifying device, means for impinging the air against the surface, a regulating device responsive to changes in the differential between the dewpoint temperature of the air leaving the humidifying device and the temperature of the cooling medium, and means for varying the volume of cooling medium under control of said regulating device, whereby a constant difference between the dewpoint temperature of the air and the temperature of the surface may be maintained.

9. In a combination of apparatus of the character described, a drum having a surface to be cooled, means for controlling the temperature of the surface of the drum, a device for humidifying air, means for controlling the dewpoint temperature of air treated by said device, a reheating device responsive to hygrostatic control for controlling the relative humidity of the air treated by said device, and means for impinging said air against the surface of the drum.

10. In an apparatus of the character described, a combination of a surface to be cooled, a cooling medium circulating adjacent one side of the surface, an air conditioning device for supplying air at a predetermined dewpoint and means for forcing said air against the other side of the surface, a differential thermostatic device responsive to changes in temperature of the coling medium and to changes in the dewpoint temperature of said air, a device for varying the volume of the cooling medium under the control of the differential thermostat, and a reheating device for reducing the relative humidity of the air.

11. In an apparatus of the character described, the combination of a drum, a cooling medium circulating within the drum, means for controlling the temperature of the outer surface of the drum by controlling the circulation of the cooling medium, means for conditioning air including a fan, a spray chamber, a liquid circulating pump, a heater, a thermostatic device for controlling the liquid temperature, and means for reheating said air to assume a desired relative humidity, and means for forcing the air against the surface of the drum whereby moisture may be condensed thereon.

12. In a system of the character described, a drum, a printing surface on the drum, means for controlling the temperature of said surface, a conditioning device, means for controlling the dewpoint of air passing through the device and impinging said air against the surface, and a differential regulating control for maintaining a desired differential between the temperature of the surface and the dewpoint of air impinging against the surface operative responsive to varying heat load conditions whereby the dewpoint of the air will be varied while the temperature of the surface is maintained constant.

13. In a system for dampening printing surfaces in a planographic printing press by condensation, the combination of means for reducing the temperature of a printing surface to below the dewpoint of the air surrounding it, means for supplying conditioned air to the vicinity of said surface, and means for automatically controlling the amount of condensed moisture on said surface by maintaining during the operation of the press a predetermined relationship between said dewpoint and the temperature of said surface.

14. A method of producing a uniform film of moisture upon a surface, consisting in controlling the temperature of the surface in response to variations in the heat load affecting the surface, impinging against the surface air having a dewpoint temperature which is higher than the temperature of said surface, and controlling the dewpoint temperature of said air in response to variations in the heat load affecting said dewpoint temperature, and also, in response to variation in the heat load affecting said surface, thereby to maintain constant the difference between said dewpoint temperature and said surface temperature.

15. The method of producing an ink repelling film upon a printing surface, consisting in cooling the printing surface of a printing member by circulating a refrigerant within said member, automatically controlling the temperature of said surface in accordance with temperature changes in said refrigerant, supplying to the vicinity of said surface a medium capable of being condensed, controlling the condition of said medium, and automatically controlling the differential between the temperature of said refrigerant and the condition of said medium to thereby maintain a condition of practical dewpoint.

MERRILL B. GODDARD.